2,875,210
Patented Feb. 24, 1959

2,875,210
CHEMICAL COMPOSITIONS

Carol H. Bollenback, Maywood, and Carl E. Johnson, Westchester, Ill., assignors to National Aluminate Corporation, Chicago, Ill., a corporation of Delaware No Drawing. Application May 17, 1956
Serial No. 585,390

5 Claims. (Cl. 260—309.6)

This invention relates to new chemical compositions, more particularly to chemical compounds having the general formula

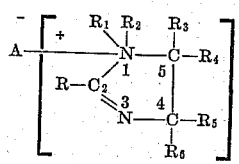

where A is an anion, R is a higher aliphatic hydrocarbon group, $R_1$ is a halogen substituted hydrocarbon or halogen and hydroxy substituted hydrocarbon group, preferably containing not more than six carbon atoms, $R_2$ is a lower aliphatic group containing not more than six carbon atoms, and $R_3$, $R_4$, $R_5$ and $R_6$ are hydrogen or lower alkyl groups. These compounds can be described as 1,2-substituted imidazolines containing a halohydrocarbon substituent attached to a nitrogen atom in the 1-position.

One of the objects of the invention is to prepare new compositions which can be employed for a wide variety of purposes.

Another object of the invention is to prepare compositions which are useful per se and also useful as intermediates to prepare other compositions.

Still a further object of the invention is to prepare compositions which are especially useful as bactericides and which exhibit microbiological activity over a relatively wide pH range.

An additional object is to prepare compositions which exhibit microbiological activity in both acid and alkaline pH media.

Another object is to prepare compositions which exhibit microbiological activity in the presence of fibers, such as cellulose fibers used in paper making and in the manufacture of textiles.

A further object is to prepare compositions which exhibit microbiological activity in the presence of anionic dispersing agents such as are used as wetting agents and detergents.

Still a further object is to prepare new and useful compositions which can be employed as corrosion inhibitors and at the same time act as bactericides and algaecides in the secondary recovery of petroleum by water flooding techniques and in salt water disposal systems.

Another object is to prepare new and improved compositions from readily available raw materials. Other objects will appear hereinafter.

The new compositions prepared in accordance with the invention are usually thin to thick, greasy solids which are yellow to brown in color. These compositions, as indicated by the general formula for the compounds given above, are predominantly quaternary salts. They tend to melt or liquefy when heated but also tend to decompose if heated at too high a temperature. The exact decomposition temperature will vary depending upon the compounds but usually decomposition begins somewhere around 150° C. The exact mechanism of the decomposition is not known. It is not essential for the purpose of the invention that the compositions be pure quaternary salts. Normally they are mixtures containing a predominating amount, say 65% to 75% of a quaternary salt having the formula previously given, and minor amounts of starting materials and by-products.

The compositions of the invention are preferably prepared by reacting a compound containing an imidazoline nucleus with a dihalohydrocarbon or a dihalohydrocarbon containing a hydroxyl substituent. These compounds are also sometimes described as glyoxalidines. Examples of suitable 1,2-imidazolines from which the imidazolinium compounds of the invention may be formed are described in Wilson, U. S. Patents 2,267,965 and 2,355,837. The imidazolines used as starting materials are preferably formed by reacting a fatty acid or a fatty oil from which the acid is derived with an alkylene polyamine, e. g., ethylenediamine or 1,2-propylenediamine, or a hydroxy alkyl alkylene polyamine, e. g., hydroxyethylethylenediamine, or a polyalkylene polyamine, e. g., diethylenetriamine, triethylenetetramine, or tetraethylene pentamine. Such polyamines react with the fatty acid (or equivalent quantities of the fatty oil) in equimolecular amounts to produce a 1,2-imidazoline containing a single imidazoline nucleus which is the five-membered ring structure of the foregoing formula.

Many different types of imidazolines have heretofore been prepared. The novel feature of the present invention resides in the preparation of quaternized imidazolines where the quaternizing group is a dihaloalkane so that one of the halogen atoms in the dihaloalkane becomes an anion when the resultant compound is added to water and the other remains as a substituent of the original hydrocarbon group. The anion A in the formula previously given which is initially a halogen atom can be converted by metathesis or by ion exchange in any suitable manner. An example of metathesis is the reaction with a water soluble compound of a metal that forms insoluble halides such as silver nitrate or the like, to produce imidazolinium salts containing other anions, as, for example, sulfates, nitrates, nitrites, phosphates and carbonates. In all such salts, however, the radical $R_1$ is a halogen substituted hydrocarbon group or a halogen substituted hydrocarbon group which also contains a hydroxy substituent.

The quaternary imidazoline salts of the present invention are prepared by reacting a 1,2-imidazoline capable of being converted to a quaternary salt by quaternization of the nitrogen atom in the 1-position and a dihalohydrocarbon or a dihalohydroxy hydrocarbon merely by mixing the two reactants in substantially equimolar proportions and gently heating until the resultant product is completely water soluble. The temperature of heating may vary depending upon the reactants but is usually within the range of 60° C. to 105° C. for a period of time not exceeding four hours. Once the reaction is started by heating to around 45° C. to 50° C. it proceeds exothermically and cooling is required to keep the temperature below about 150° C. and preferably below about 105° C. in order to avoid the formation of decomposition products. In the examples hereinafter given to illustrate the preparation of the compositions of the invention it will be understood that the foregoing general conditions are employed.

For the purpose of the present invention it is preferable that the radical R in the general formula contain at least seven carbon atoms, that the radical $R_2$ be composed of C, H and O atoms and that the radical $R_1$ be composed of C, H, O and halogen atoms. The radicals $R_3$, $R_4$, $R_5$ and $R_6$ are preferably hydrogen atoms but can be lower alkyl groups, e. g., methyl, ethyl, propyl, butyl, isobutyl, amyl or hexyl. The radical R preferably contains from 7 to 17 carbon atoms but can contain a greater number of carbon atoms depending upon the number of carbon atoms in the organic carboxy acid initially employed in preparing the 1,2-imidazoline employed as a starting material. The radical R can also be saturated or unsaturated, for example, it can be the undecenyl group or the heptadecenyl group. Excellent results in the practice of the invention are obtained by using as starting materials imidazolines derived from the reaction of a polyamine and a fatty oil such as cocoanut oil, palm oil, tallow, the glyceride of lauric acid, linseed glycerides, tall oil and other well known and readily available oils.

The following examples in which the quantities are stated in parts by weight will illustrate some of the compositions prepared falling within the scope of the invention.

EXAMPLE I 6.6 parts of trimethylene dibromide were reacted with 20 parts of 1-hydroxyethyl-2-tridecyl imidazoline (derived from myristic acid and hydroxyethylethylenediamine) under the general reaction conditions previously described at temperatures within the range of 45° C. to 105° C. for a period of time not exceeding 4 hours until a water soluble product was obtained.

EXAMPLE II

The procedure described in Example I was carried out using 13.3 parts of trimethylene dibromide instead of 6.6 parts.

EXAMPLE III

The procedure described in Example I was carried out using 20 parts of a 1,2-imidazoline derived by the reaction of hydroxyethylethylenediamine and coconut fatty acid and 10.6 parts of 1-chloro-2-bromopropane.

EXAMPLE IV

The reaction described in Example III was carried out using 14.3 parts of trimethylene dibromide instead of the 10.6 parts of 1-chloro-2-bromopropane.

EXAMPLE V

The process of Example III was carried out using 8.7 parts of 1,4-dichlorobutane instead of the 10.6 parts of 1-chloro-2-bromopropane.

EXAMPLE VI

The process of Example III was carried out except that the 1,2-imidazoline was prepared by reacting coconut oil with hydroxyethylethylenediamine and 20 parts of the resultant product were reacted with 6.2 parts of 1,4-dichlorobutane under the general reaction conditions previously described in Example I.

EXAMPLE VII

The process of Example III was carried out using 7.8 parts of 1,3-dichloropropane instead of the 10.6 parts of 1-chloro-2-bromopropane.

EXAMPLE VIII

The process of Example VI was carried out using 5.8 parts of 1,3-dichloropropane instead of the 6.2 parts of 1,4-dichlorobutane.

EXAMPLE IX

The process of Example VI was carried out using 7.8 parts of 1,3-dichloropropane instead of the 6.2 parts of 1,4-dichlorobutane.

EXAMPLE X

The process of Example III was carried out using 10 parts of dichloropentane instead of the 1-chloro-2-bromopropane.

EXAMPLE XI

A bactericidal composition was prepared by mixing together the quaternary salt of Example V, isopropanol, water and a corrosion inhibitor in the following proportions:

| Ingredients: | Percent by weight |
|---|---|
| Isopropanol | 20 |
| Quaternary imidazoline salt of Example V | 20 |
| Chicago tap water | 53 |
| Sodium nitrite | 7 |

This composition is an excellent bactericide and can be used to kill bacteria such as *Aerobacter aerogenes* and Pseudomonas organisms.

In evaluating the compositions of the invention as bactericides one method employed was that described by Bollenback and Cruickshank in Analytical Chemistry, vol. 26, page 1355, August 1954. In this method the number of parts per million (p. p. m.) of the active compound required to kill *A. aerogenes* in a contact time of one hour is determined using an inoculum prepared by adjusting an 18- to 22-hour broth culture of *A. aerogenes* to approximately one million organisms per ml. in distilled water immediately before use in the test. The adjusted culture is used within five minutes after its preparation and the test is carried out with one ml. of an appropriate inoculum and one 1 ml. of a 0.1% stock solution of the chemical to be tested. The results in terms of active bactericidal ingredient are given in p. p. m. in the following table.

*Table I*

| Composition Tested | 1 Hour Plate Kill Against *A. aerogenes* in p. p. m. |
|---|---|
| Example I | 1-2 |
| Example II | 1-2 |
| Example III | 4-8 |
| Example IV | 4-8 |
| Example V | 2-4 |
| Example VI | 2-8 |
| Example VII | 2-8 |
| Example VIII | 2-8 |
| Example IX | 4-8 |
| Example X | 4-16 |

It was noted that the use of diluted preparations of the materials to be tested magnified any differences in microbiological activity. Consequently, a number of formulations were prepared containing 20% by weight of the active ingredient in isopropyl alcohol. Using a gas tube method for microbiological tests instead of the agar plate method it was found that the composition of Example V was effective in producing a microbiological inhibition of *A. aerogenes* in proportions of 25 to 50 p. p. m. at a pH of 5.4 and 7.8 over a 24 hour period. In a one hour period 50 to 100 p. p. m. of the composition of Example V was effective.

In the presence of an anionic dispersing agent, such as isopropyl naphthalene sodium sulfonate, in proportions of 50 p. p. m. and in the presence of 0.5% fiber, inhibition was obtained at 300 to 500 p. p. m. of a 20% isopropanol solution of the composition of Example V.

In a test using Pseudomonas as the contaminating organisms on an agar plate test a 20% isopropanol solution of the composition of Example V was effective in proportions of 10 to 20 p. p. m. to secure a plate kill of 99.99% in one hour. This was superior to the result obtain with a quaternary salt made in the same manner as the composition of Example V using 8.8 parts of benzyl chloride instead of the 8.7 parts of 1,4-dichlorobutane.

The compositions of the invention were also tested in a series of down-hole corrosion tests of the type employed to determine whether a composition is effective in providing corrosion protection to oil and gas well equipment and were found to be substantially effective when used in proportions of 5 to 100 p. p. m.

In some of the foregoing examples, such as Example I, the molar ratio of 1,2-imidazoline to dihaloalkane is approximately 2:1 and in these proportions a bis-compound is formed containing two imidazoline nuclei. In a similar manner, if any of the quaternary salts containing halogen in a hydrocarbon group attached to the nitrogen atom in the 1-position is further reacted with an additional mol of a 1,2-imidazoline bis-compounds are produced. These products seem to have bactericidal properties generally similar to the imidazolinium quaternary salts of the present invention containing a single imidazoline nucleus.

In any of the foregoing examples 1,3-dichlor-2-hydroxy propane or 1,3-dibrom-2-hydroxy propane can be substituted for the dihaloalkane to produce a compound of the type described in which the halohydrocarbon substituent in the 2-position also contains a hydroxy group. It will be understood by those skilled in the art that other variations can be made in the reactants in order to produce other compounds coming within the scope of the invention.

The quaternary imidazoline salts produce as described in the examples may be described chemically according to well known chemical nomenclature. Thus, the product of Example I can be described as bis-N-(hydroxyethyl-2-tridecyl imidazolinium)-1,3-propane bromide. The quaternary salt of Example II can be described as 1-bromopropyl-1-hydroxyethyl-2-tridecyl imidazolinium bromide. The quaternary salt of Example III is a mixture in which the principal ingredient can be described as 1-(2-bromopropyl)-1-hydroxyethyl-2-undecyl imidazilinium chloride. The product of Example IV likewise is a mixture of quaternary salts in which the principal ingredient is 1-bromopropyl-1-hydroxyethyl-2-undecyl imidazolinium bromide. The product of Example V is a mixture in which the principal ingredient can be described as 1-(4-chlorobutyl)-1-hydroxyethyl-2-undecyl imidazolinium chloride. The product of Example VI has the same chemical name as the principal ingredient of Example V. The product of Example VII is a mixture in which the principal ingredient is 1-(3-chloropropyl)-1-hydroxyethyl-2-undecyl imidazolinium chloride. The product of Example VIII is similar to the product of Example VII except that it was obtained in substantially pure form. The product of Example X can be described as 1-chloropentyl-1-hydroxyethyl-2-undecyl imidazolinium chloride. In Examples III, IV, V, VII and X where the 1,2-imidazoline was initially prepared from coconut oil and hydroxyethylethylenediamine, since the coconut oil contains mainly $C_8$ to $C_{14}$ fatty acids and the resultant imidazoline is a mixture containing $C_7$ to $C_{13}$ hydrocarbon groups in the 2-position, the products obtained are referred to herein for convenience as 1-haloalkyl-1-hydroxyethylene-2-coco imidazolinium halides.

The invention provides new and useful chemical compositions which are useful per se and can also be employed as intermediates to prepare other compositions. These new chemical compositions exhibit microbiological activity over a relatively wide pH range and are useful in both acid and alkaline pH media. They are particularly useful as slimicides, algaecides, and bactericides in many different industries, especially in the paper making industry. These can also be employed in conjunction with wetting agents and detergents and as corrosion inhibitors, bactericides and algaecides in the down-hole treatment of oil and gas well equipment, in water flooding processes for the secondary recovery of oil and in salt water disposal systems. The compositions of the invention, moreover, can be prepared by rather simple procedures from a wide variety of readily available raw materials.

The term "1,2-imidazoline" as employed herein without further qualification refers to an imidazoline compound in which the 1- and 2-positions contain a substituent and the nitrogen atom in the 1-position is capable of being quaternized. Although bromine and chlorine derivatives are used in the examples to illustrate the invention, it will be understood that the term "halogen" includes bromine, chlorine and iodine, and the term "halide" includes bromide, chloride and iodide.

The expression "medium containing bacteria" as employed herein is used in the general sense to include water containing bacteria and other types of media to which compositions of the invention can be added for the purpose of inhibiting the growth of the bacteria.

The gas tube method for making microbiological tests previously referred to is carried out as follows. The culture medium used consists of 24 grams of dextrose, 1 gram of Basaminbact (Anheuser Busch), added to 1 liter of Chicago tap water and sterilized by autoclaving under 15 pounds of pressure for 15 minutes. An appropriate amount of an 18 to 24 hour nutrient broth culture of A. aerogenes is mixed with 200 ml. of the culture medium immediately before starting tests. The amount of culture is such as to give one million organisms per ml. of medium. 20 ml. of the inoculated culture medium is placed in each of a series of fermentation tubes with caps. Without touching the sides of the tubes a given amount of chemical to be tested is introduced using an appropriate concentration of stock chemical to avoid more than a 5% error in final dilution. For this purpose the volume of chemical introduced should be 1 ml. or less. The chemical and the inoculated medium are mixed gently. A control test is also run in which the chemical is omitted. In mixing, each tube is inverted in such a manner as to fill the upright closed end of the tube with the test liquid. The tubes are incubated at 30° C. for 24 hours. At the end of 1 hour contact and again after 24 hours contact a loopful of the test mixture is withdrawn from each tube and inoculated in a subculture tube containing 10 ml. of sterile nutrient broth. The subculture tubes are incubated at 37° C. for 48 hours and examined for growth. The results of these tests indicate 1 and 24 hour killing ranges. The gas production for inhibition level is recorded at 48 hours.

The invention is hereby claimed as follows:

1. A composition having the following structural formula

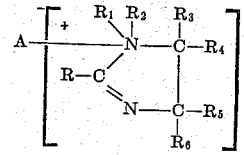

where A is an anion, R is a higher aliphatic hydrocarbon group containing 7 to 17 carbon atoms, $R_1$ is a group from the class consisting of aliphatic monohalohydrocarbon containing not more than 6 carbon atoms and aliphatic monohalomonohydroxyhydrocarbon containing not more than 6 carbon atoms; $R_2$ is a lower aliphatic group containing not more than 6 carbon atoms, and $R_3$, $R_4$, $R_5$ and $R_6$ are groups from the class consisting of hydrogen and lower alkyl groups.

2. 1-hydroxyethyl-1-chloro-lower alkyl imidazolinium chloride in which the carbon atom in the 2-position is linked to an aliphatic hydrocarbon group containing 11 to 17 carbon atoms.

3. 1-hydroxyethyl-1-chloro-lower alkyl-2-coco imidazolinium chloride.

4. 1-hydroxy-ethyl-1-chlorobutyl-2-coco imidazolinium chloride.

5. 1-hydroxyethyl-1-chloropropyl-2-coco imidazolinium chloride.

References Cited in the file of this patent

UNITED STATES PATENTS

| | | |
|---|---|---|
| 2,267,965 | Wilson | Dec. 30, 1941 |
| 2,540,171 | Kiff | Feb. 6, 1951 |
| 2,643,227 | Hughes | June 23, 1953 |